United States Patent
Chen

(10) Patent No.: US 10,713,535 B2
(45) Date of Patent: Jul. 14, 2020

(54) METHODS AND PROCESSES OF ENCRYPTED DEEP LEARNING SERVICES

(71) Applicant: NovuMind Limited, Grand Cayman (KY)

(72) Inventor: Monchu Chen, Mountain View, CA (US)

(73) Assignee: NovuMind Limited, Grand Cayman (KY)

(*) Notice: Subject to any disclaimer, the term of this patent is extended or adjusted under 35 U.S.C. 154(b) by 127 days.

(21) Appl. No.: 16/132,078

(22) Filed: Sep. 14, 2018

(65) Prior Publication Data

US 2019/0087689 A1 Mar. 21, 2019

Related U.S. Application Data

(60) Provisional application No. 62/559,428, filed on Sep. 15, 2017.

(51) Int. Cl.
| | |
|---|---|
| *G06N 3/04* | (2006.01) |
| *G06K 9/62* | (2006.01) |
| *G06F 21/60* | (2013.01) |
| *G06N 3/08* | (2006.01) |
| *H04L 9/08* | (2006.01) |

(Continued)

(52) U.S. Cl.
CPC ......... *G06K 9/6262* (2013.01); *G06F 21/602* (2013.01); *G06F 21/6227* (2013.01); *G06K 9/6256* (2013.01); *G06K 9/6271* (2013.01); *G06N 3/04* (2013.01); *G06N 3/08* (2013.01); *H04L 9/008* (2013.01); *H04L 9/0825* (2013.01); *G06F 2221/2107* (2013.01); *H04L 2209/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,900,147 | B2 | 2/2018 | Laine | |
| 2011/0311042 | A1* | 12/2011 | Cheddad | G06F 21/64 380/28 |

(Continued)

OTHER PUBLICATIONS

Manel Dridi, "Cryptography of medical images based on a combination between chaotic and neural network",IET Image Process., Jun. 23, 2016, vol. 10 Iss. 11, pp. 830-839.*

(Continued)

*Primary Examiner* — Omar S Ismail
(74) *Attorney, Agent, or Firm* — Arch & Lake LLP

(57) ABSTRACT

A computer system may provide Encrypted Deep Learning Service (EDLS) to a client. The computer system includes one or more processors and memory storing instructions. When instructions are executed by the one or more processors, the instructions cause the computer system to perform acts including: receiving training data from the client, where the training data comprise cipher images that are encrypted using an orthogonal transformation that hides sensitive information in original images. The acts further include training a deep neural network using the training data in the computer system; and producing cipher inference using the deep neural network when the computer system receives new data including new images encrypted using the orthogonal transformation.

17 Claims, 17 Drawing Sheets

(51) Int. Cl.
  *H04L 9/00* (2006.01)
  *G06F 21/62* (2013.01)

(56) References Cited

U.S. PATENT DOCUMENTS

| | | | |
|---|---|---|---|
| 2015/0036889 A1* | 2/2015 | Ananda Yogendran | ................... G06T 7/0016 382/107 |
| 2016/0292589 A1* | 10/2016 | Taylor, Jr. | ............ G06F 16/1744 |
| 2017/0061253 A1* | 3/2017 | Burgos | ....................... G06T 7/70 |
| 2017/0347061 A1* | 11/2017 | Wang | .................... G06T 3/4046 |
| 2018/0018590 A1* | 1/2018 | Szeto | ................. G06F 21/6254 |
| 2018/0314985 A1* | 11/2018 | O'Shea | .................... G06N 3/08 |
| 2018/0330179 A1* | 11/2018 | Streit | ................... G06K 9/4628 |
| 2018/0367192 A1* | 12/2018 | O'Shea | ................ G06N 3/0445 |
| 2019/0130207 A1* | 5/2019 | Yeoh | ....................... G06K 9/527 |
| 2019/0182436 A1* | 6/2019 | Gupta | ................. G11B 27/036 |
| 2019/0206015 A1* | 7/2019 | Lau | ....................... G06F 21/602 |

OTHER PUBLICATIONS

Dowlin et al., "CryptoNets: Applying Neural Networks to Encrypted Data with High Throughput and Accuracy," Microsoft Research, Redmond, USA, Princeton University, New-Jersey, USA, Feb. 24, 2016, 12 pages.

\* cited by examiner

| | CryptoNets | Disclosed method |
|---|---|---|
| CPU | Intel Xeon E5-1620 @ 3.5GHz | Intel Core i5-4460 @ 3.2GHz |
| Geekbench Score | 13,723 | 10,041 |
| Relative CPU Speed | 100% | 73% |
| Memory Footprint | 15x | 1x |
| Relative Memory Requirement | 100% | 7% |
| Predictions per hour | 58,982 | 16,544,448 |
| Relative Prediction Speed | 100% | 28050% |
| Normalized Prediction Speed (When comparison done on the same CPU) | 1x | 384x |

FIG. 9

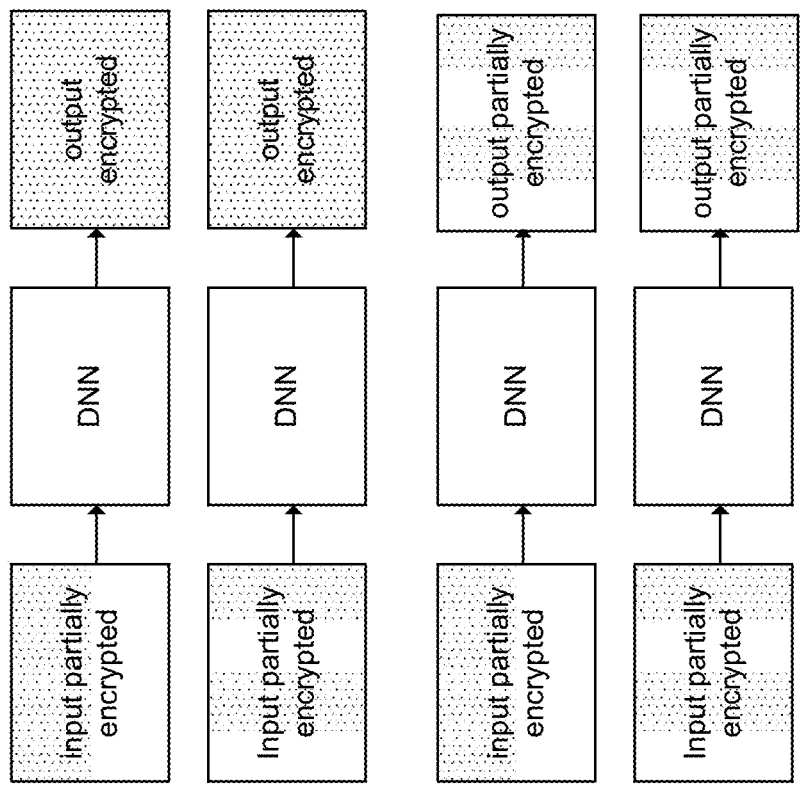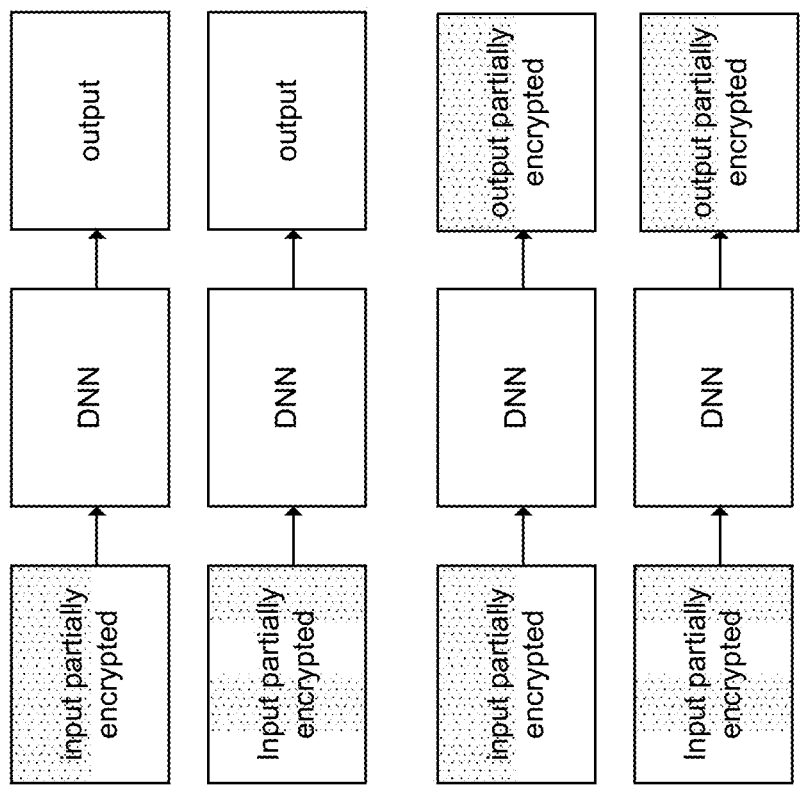
FIG. 12

US 10,713,535 B2

METHODS AND PROCESSES OF ENCRYPTED DEEP LEARNING SERVICES

CROSS-REFERENCE TO RELATED APPLICATION

This application is filed based upon and claims priority to U.S. Patent Provisional Application No. 62/559,428, filed on Sep. 15, 2017, the entire contents of which are incorporated herein by reference for all purposes.

TECHNICAL FIELD

The present disclosure generally relates to Deep Learning and Deep Learning Services (DLS). In particular, the present disclose relates to systems, methods and techniques for encrypted deep learning services (EDLS) configured to protect confidential client information from exposure during the training and inference conducted process conducted by the EDLS provider.

BACKGROUND

Deep Learning Services (DLS) when utilizing confidential or otherwise sensitive information often offer a data owner to host an in-house or private DLS in order to ensure data confidentiality. An in-house DLS may not be viable option in all instances and are often expensive solutions. In order to safeguard confidential or otherwise sensitive information the data owner may utilize an Encrypted Deep Learning Service (EDLS) hosted by an EDLS provider. However, to configure the EDLS the data owner is often forced to reveal the confidential or sensitive information. An EDLS which accepts encrypted data for training and inference could minimize or eliminate the risk of the confidential or sensitive information being revealed to unauthorized parties.

SUMMARY

According to a first aspect of the present disclosure, there is provided a computer system providing Encrypted Deep Learning Service (EDLS) to a client. The computer system may include one or more processors and memory storing instructions that, when executed by the one or more processors, cause the computer system to perform acts including: receiving training data from the client, wherein the training data comprise cipher images that are encrypted using an orthogonal transformation that hides sensitive information in original images; training a deep neural network using the training data in the computer system; and producing cipher inference using the deep neural network when the computer system receives new data comprising new images encrypted using the orthogonal transformation.

According to a second aspect of the present disclosure, there is provided an apparatus for providing EDLS. The apparatus may include one or more processors and memory storing instructions that, when executed by the one or more processors, cause the apparatus to perform acts including: receiving data from a client, where the data are partially encrypted using an orthogonal transformation that hides sensitive information in the data; and producing inference using a deep neural network when receiving the data that are partially encrypted using the orthogonal transformation.

According to a third aspect of the present disclosure, there is provided a method, which may be implemented by a computer system. The method may include: receiving training data from a client, where the training data comprise cipher images that are encrypted using an orthogonal transformation that hides sensitive information in original images. The acts further include training a deep neural network using the training data in the computer system; and producing cipher inference using the deep neural network when the computer system receives new data including new images encrypted using the orthogonal transformation.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

FIG. 9 is a comparison chart related to the encryption and decryption processes of the disclosed embodiments.

FIG. 12 illustrates various combinations of encrypted data and unencrypted data that may be provided to an EDLS.

DETAILED DESCRIPTION

The terminology used in the present disclosure is for the purpose of describing examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with some aspects related to the present disclosure as recited in the appended claims.

Figure 1:
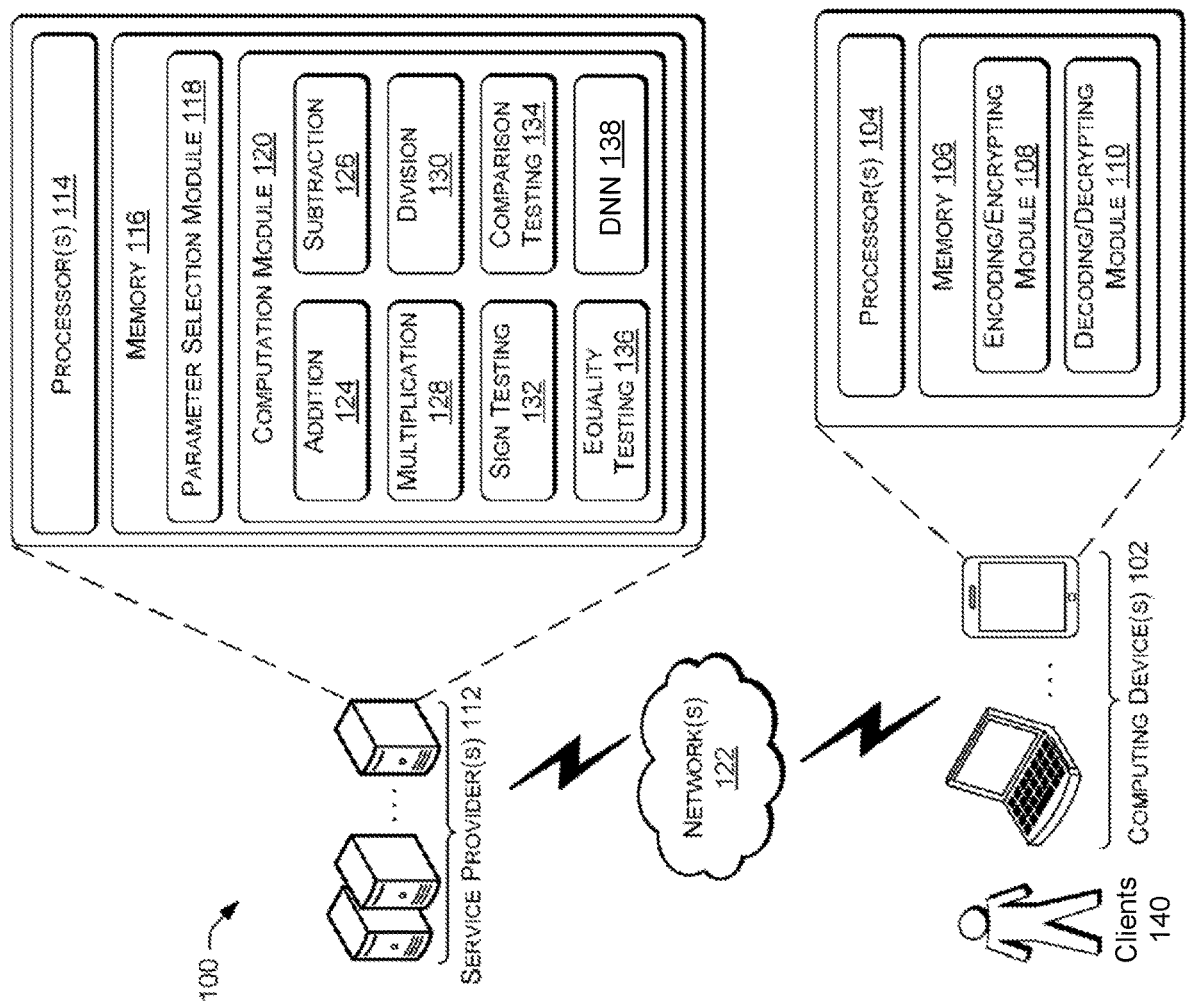
FIG. 1 is an example system according to one or more examples.

FIG. 1 is an example environment to implement the techniques and/or systems according to one or more examples in the disclosure. The example system 100 is configured to provide EDLS to clients 140.

The environment 100 may include at least one computing device 102 having processor(s) 104 and a memory 106 including an encoding/encrypting module 108 and a decoding/decrypting module 110. In various embodiments, the encoding/encrypting module 108 may include one or more programs or hardware that operates to encode and/or encrypt data in a scheme for secure remote computation. The environment 100 also includes service provider(s) 112 to provide one or more services to the computing device 102, such as the secure remote computing. To that end, the service provider 112 may include processor(s) 114 and a memory 116 including a parameter selection module 118 and a computation module 120 provide the secure remote computing, which is explained in connection with the figures provided in this disclosure.

The computing device 102 may include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 102 may include one or more processor(s) 104 and memory 106. The processor(s) 104 may be a single processing unit or a number of units, each of which could include multiple different processing units. The processor(s) 104 may include one or more microprocessors, microcomputers, microcontrollers, digital signal processors, central processing units (CPUs), graphics processing units (GPUs), security processors, special-purpose processors for AI inference applications, and/or other processors. Alternatively, or additionally, some or all of the techniques described herein may be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 104 may be configured to fetch and/or execute computer-readable instructions stored in the memory 106.

The memory 106 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that may be used to store information for access by a computing device.

In contrast, communication media includes computer-readable instructions, data structures, program modules, or other data in a modulated data signal, such as a carrier wave. As defined herein, computer storage media does not include communication media.

In various embodiments, the computing device 102 may communicate with the service provider 112 via one or more wired or wireless networks 122, such as the Internet, a Mobile Telephone Network (MTN), or other various communication technologies.

In various embodiments, the memory 106 may include an operating system configured to manage hardware and services within and coupled to the computing device 102 for the benefit of other components and other devices.

The encoding/encrypting module 108 and the decoding/decrypting module 110 may include hardware and/or software components. For example, the encoding/encrypting module 108 and/or the decoding/decrypting module 110 may be implemented by one or more modules stored in the memory 106 and/or by one or more components of the processor(s) 104. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components, such as FPGAs, ASICs, ASSPs, state machines, CPLDs, other logic circuitry, SoCs, and so on.

The encoding/encrypting module 108 may perform operations to cipher, encode, or encrypt data in accordance with embodiments of the disclosure. For example, the encoding/encrypting module 108 may utilize parameters generated by the service provider 112 to encode data using the techniques disclosed herein. Further, the encoding/encrypting module 108 may generate a public key based at least in part on the parameters generated by the service provider 112 to encrypt the encoded data.

The decoding/decrypting module 110 may perform operations to decipher, decrypt, or decode data in accordance with embodiments of the disclosure. For example, the decoding/decrypting module 110 may utilize parameters generated by the service provider 112 to generate a secret key for decrypting the encrypted data. Further, the decoding/decrypting module 110 may decode the decrypted data to obtain a plaintext result.

The service provider 112 may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely from the computing device 102.

The one or more computing devices of the service provider 112 may include one or more processor(s) 114 and memory 116. The one or more processor(s) 114 may comprise a single processing unit or a number of units, each of which could include multiple different processing units. The one or more processor(s) 114 may include, for example, one or more microprocessors, microcomputers, microcontrollers, digital signal processors, CPUs, GPUs, security processors, etc.

The memory 116 may include a parameter selection module 118 for automatically selecting parameters using an error growth simulator. For example, the parameter selection module 118 may receive a program, sequence, or series of operations from the computing device 102, for example, to perform on homomorphically encrypted data. As described below in connection with FIGS. 2 and 8-10, the parameter selection module 118 may operate a program to determine operating parameters such as a plaintext modulus T, a length N of a polynomial, a modulus Q, a standard deviation of error $\sigma$, a decomposition bit count W, a base B for encoding integers or real numbers into plaintext polynomials, a desired security level, an allowable error level, and the like. After parameters are generated and/or selected by the parameter selection module 118, the parameters may be transmitted to the computing device 102, to be used by the encoding/encrypting module 108 and/or by the decoding/decrypting module 110.

The memory 116 may also include a computation module 120 to perform computations on encoded data received from the computing device 102. The computation module 120 may include various computation modules such as: addition module 124, subtraction module 126, multiplication module 128, division module 130, sign testing module 132, comparison testing module 134, equality testing module 136, and Deep Neural Network (DNN) 138.

For example, the computation module 120 may implement a DNN program such as a machine learning program, a prediction engine, an image analysis program, a financial program, or any other DNN program that performs calculations on encrypted data. For example, the computation module 120 may include a financial service program, and may receive financial data encoded by the encoding/encrypting module 108. In another example, the computation module 120 may include a genomic data analysis program to perform predictive analysis on genomic data encoded and/or encrypted by the encoding/encrypting module 108. As may be understood in the context of this disclosure, the computation module 120 may include any program, computation, or operation that may be performed on data. In various embodiments, the computation module 120 may perform computations on the received encoded and/or encrypted data and may generate an encoded and/or encrypted result, which may be transmitted to the computing device 102 for decryption and/or decoding by the decoding/decrypting module 110.

The environment 100 also includes one or more clients 140 to employ the computing device 102. The one or more clients 140 may interact with the computing device 102 to perform a variety of operations.

The example processes disclosed herein (e.g., in FIG. 19) are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations may be combined in any order and/or in parallel to implement the process. Further, any of the individual operations may be omitted.

As described in connection with FIG. 1, the example system 100 may be configured to provide EDLS to clients 140. For example, one implementation of EDLS may be a secure MNIST. A MNIST (Modified National Institute of Standards and Technology) database is a large image dataset of handwritten digits (e.g., alphanumeric characters and symbols.) The MNIST database, and the images stored therein, has often been utilized to train and test image processing systems. In order to implement an EDLS, the data owner can utilize the MNIST database and encrypt the stored images before sending the encrypted data to the EDLS provider for training. In this implementation, an EDLS provider, in turn, receives unencrypted labels with the associated encrypted images but does not have the ability to access the corresponding unencrypted or clear images stored in the MNIST database. In operation, the EDLS provider uses the received unencrypted labels and the associated encrypted images to train the deep neural network (DNN) to map the encrypted images to the unencrypted labels.

Once the deep neural network has been trained utilizing the received unencrypted labels with, the data owner starts sending a different set of encrypted images to the EDLS provider for prediction of corresponding labels. The predictions are then compared against the ground truth only known to the data owner. When the predictions match the ground truth, the EDLS provider has shown an ability to infer the labels without accessing the original, unencrypted test images, preserving the privacy of the unencrypted images.

One way to provide the above-discussed EDLS is to perform computations on encrypted data to produce encrypted results that, after decryption, match the results of corresponding computations performed on plain-text. One form of encryption that allows computations on cipher-text is known as homomorphic encryption. For example, homomorphic encryption allows for computation on cipher-text by generating an encrypted result which, when decrypted, matches the result of the operations as if they had been performed on the unencrypted data. In practice, most methods using homomorphic encryption methods are partial encryption schemes (i.e. limited computations allowed) because full homomorphic encryption schemes require a high computational and data storage overhead. On top of the overhead constraints, typical neural networks are modified in order to operate on encrypted data. One specific implementation of neural networks which supports homomorphic encryption is CryptoNets. The CryptoNets product is implemented using images from the MNIST dataset which are mapped to a higher dimensional space following a homomorphic transformation. The underlying neural network is modified to support processing of encrypted data, involving significant computational overheads.

In order to address the storage and computation overhead limitations discussed above, the disclosed systems, methods and techniques for implementing an EDLS involves using a transformation that hides human-readable information within the data without inhibiting processing of the data by the original neural network. One example of a transformation that may be used as part of the disclosed systems, methods and techniques is the orthogonal transformation. The orthogonal transform maps a vector to another vector in the same finite-dimensional space while preserving the length of vectors and the angles between them.

Figure 2:
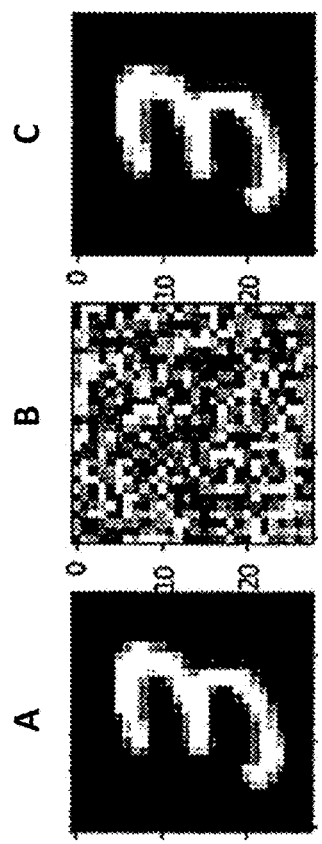
FIGS. 2-4 illustrate images from the MNIST database as manipulated utilizing the disclosed embodiments.
Figure 3:
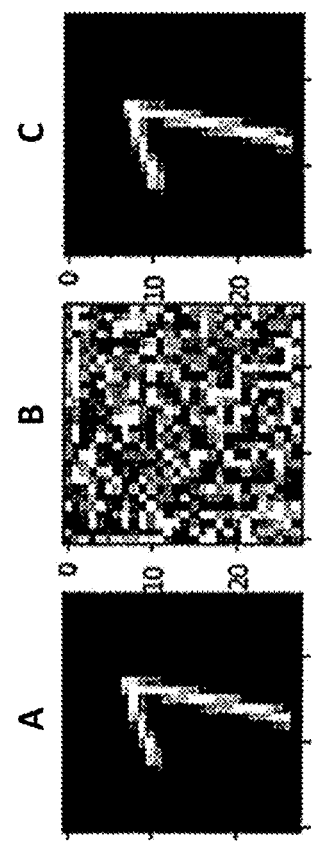
Figure 4:
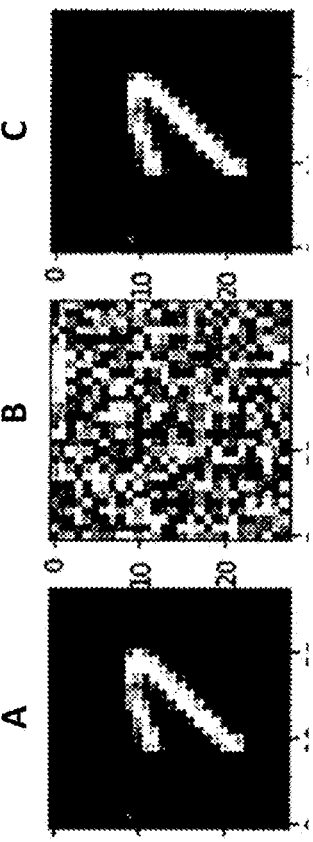

FIGS. 2-4 illustrate images from the MNIST database as manipulated utilizing the disclosed systems, methods and techniques. In particular, each of the three figures, FIGS. 2-4, includes three images representing three different stages of implementing the EDLS as disclosed. Each of the three images is identified by the letter A. B, or C. For example, FIG. 2 includes an image A depicting the alphanumeric digit "3" from the MNIST dataset. FIG. 2 further includes image B, which is the same image shown in image A of FIG. 2 after an orthogonal transformation has been performed. The image B of FIG. 2 is unrecognizable as the alphanumeric digit "3". Image C of FIG. 2 shows the results from the image B after decryption (e.g., applying the inverse transformation) has been completed. It should be noted that the decrypted image C looks virtually identical to the original, unencrypted image A. One should bear in mind that the decrypted image may not be exactly the same as the original because of the rounding errors and floating-pointing calculation precision consideration.

FIGS. 3 and 4 show additional encryption examples utilizing the same encryption key as in FIG. 2. Each of the images shown in FIGS. 3 and 4 represent different instances of the alphanumeric digit "7". In both cases, the encryption/decryption process successfully encodes the images to unrecognizable forms and then decodes the encrypted images back to human-readable forms. Since the encryption is an orthogonal transformation, the "distance" between image A of FIG. 3 and image A of FIG. 4 is the same as the distance between image B of FIG. 3 and image B of FIG. 4 in the high-dimensional space.

FIG. 3 includes an image A depicting the alphanumeric digit "7" from the MNIST dataset. FIG. 3 further includes image B, which is the same image shown in image A of FIG. 3 after the orthogonal transformation depicted in FIG. 2 has been performed. The image B of FIG. 3 is unrecognizable as the alphanumeric digit "7". Image C of FIG. 3 shows the results from image B after decryption (e.g., applying the inverse transformation) has been completed.

FIG. 4 includes an image A depicting the another, different alphanumeric digit "7" from the MNIST dataset. Image B of FIG. 4 is the same image shown in image A of FIG. 4 after the orthogonal transformation depicted in FIG. 2 has been performed. As with the image B of FIG. 3, the image B of FIG. 4 is unrecognizable as the alphanumeric digit "7". Image C of FIG. 4 shows the results from image B after decryption has been completed.

In operation, the cluster of plain images will remain in the same proximity after being encrypted with the orthogonal transformation. This implies that if a deep learning model is able to discern different clusters of digits in MNIST dataset in the high-dimensional space, the same model will be able to distinguish different clusters of the encrypted images.

Theoretically, there are infinite numbers of linear transformations which are orthogonal. Hence, there are infinite numbers of keys. In order to select a user-friendly (e.g., easily identifiable) passkey, an image may be selected to serve as a passkey for use in a specific orthogonal transformation. Images typically have more combinations then the text-based passkeys. Even when the images and passwords share the same size (same number of possible combinations), images are easier to remember and recall than the text strings with the same size.

Figure 5:
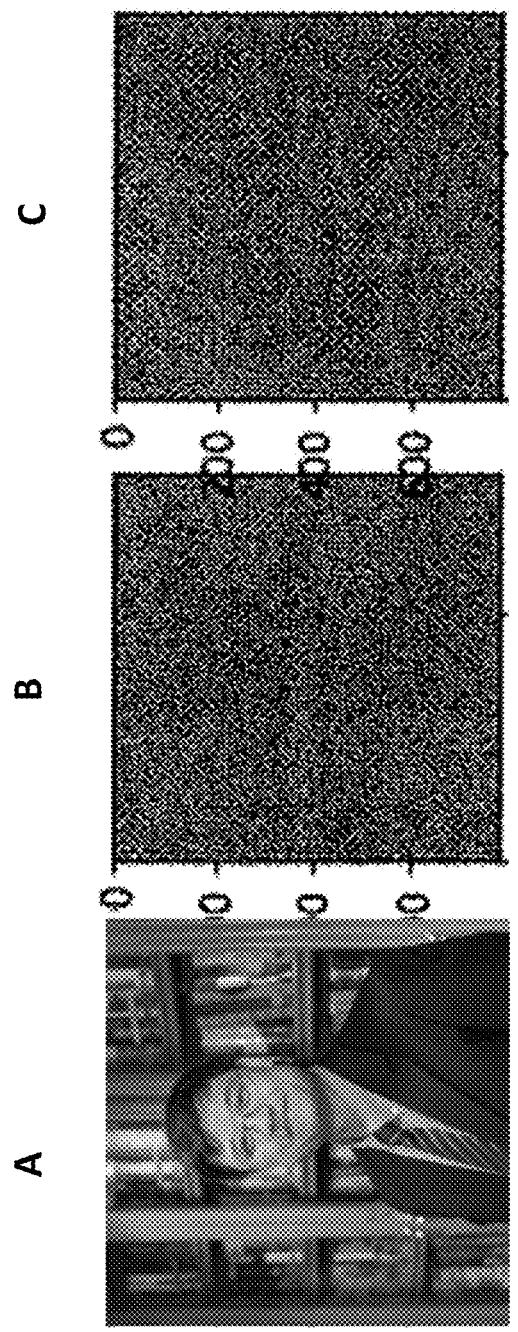
FIG. 5 illustrates a passkey and associated encryption and decryption matrices.

FIG. 5 includes an image A depicting a photograph acting as a passkey. Once an image has been identified as the passkey, a QR decomposition may be applied in order to obtain the orthogonal matrix Q (image B of FIG. 5.) In linear algebra, this operation decomposes a matrix A into a product A=QR, where Q is an orthogonal matrix and R is an upper triangular matrix. There are several methods to compute the QR decomposition, and they are widely available in different math libraries. The orthogonal matric Q shown in image B of FIG. 5 is the result matrix Q which may be used to encrypt all examples shown in previous section. Image C of FIG. 5 shows the matrix Q' (the inverse Q) which was used to decrypt all examples. Here matrix Q' is simply a transpose of matrix Q.

Figure 6:
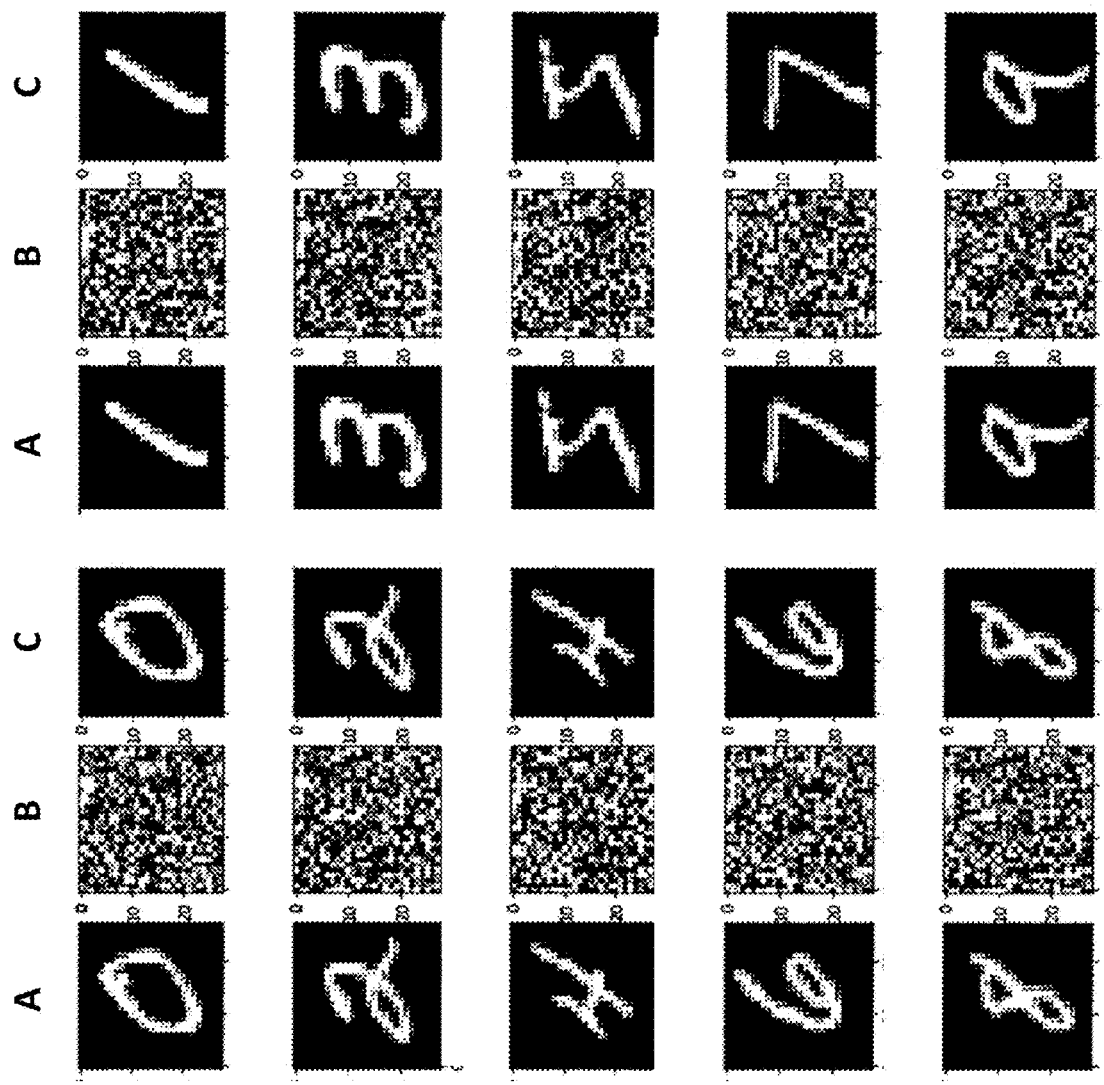
FIG. 6 illustrates multiple encryption and decryption instances according to the disclosed embodiments.

The same matrix Q derived based on image A of FIG. 5 can be utilized to encrypt any other images. For example, FIG. 6 shows instances of ten individual alphanumeric digits "0" to "9" from the MNIST database encrypted by the same orthogonal matrix generated using the image A of FIG. 5 as the passkey. The encrypted images shown in columns identified as column B in FIG. 6 looks like white noise images while the unencrypted and decrypted imaged in columns A and C are recognizable. While it may be difficult for a user to tell that the encrypted images shown in columns B of FIG. 6 are different, the disclosed deep learning network clusters the encrypted images in the same way as it is clustering the unencrypted images. Therefore, whoever providing the machine learning services may be able to train and inference the data without knowing the original contents.

In one or more of the disclosed embodiments for implementing an EDLS, an image selected or otherwise identified as a passkey to associate with a set of training, testing and inferencing tasks. However, the same passkey should be utilized for the training and inference tasks. In some embodiments, increased security may be realized by selecting multiple images as the passkey for different task or batches of training, testing, and inferencing tasks. In practice, the same passkey may be used repeatedly for performing the same task, but data encrypted based on different passkeys is not interspersed or mixed in the same batch of training, testing, and inferencing tasks.

Figure 7:
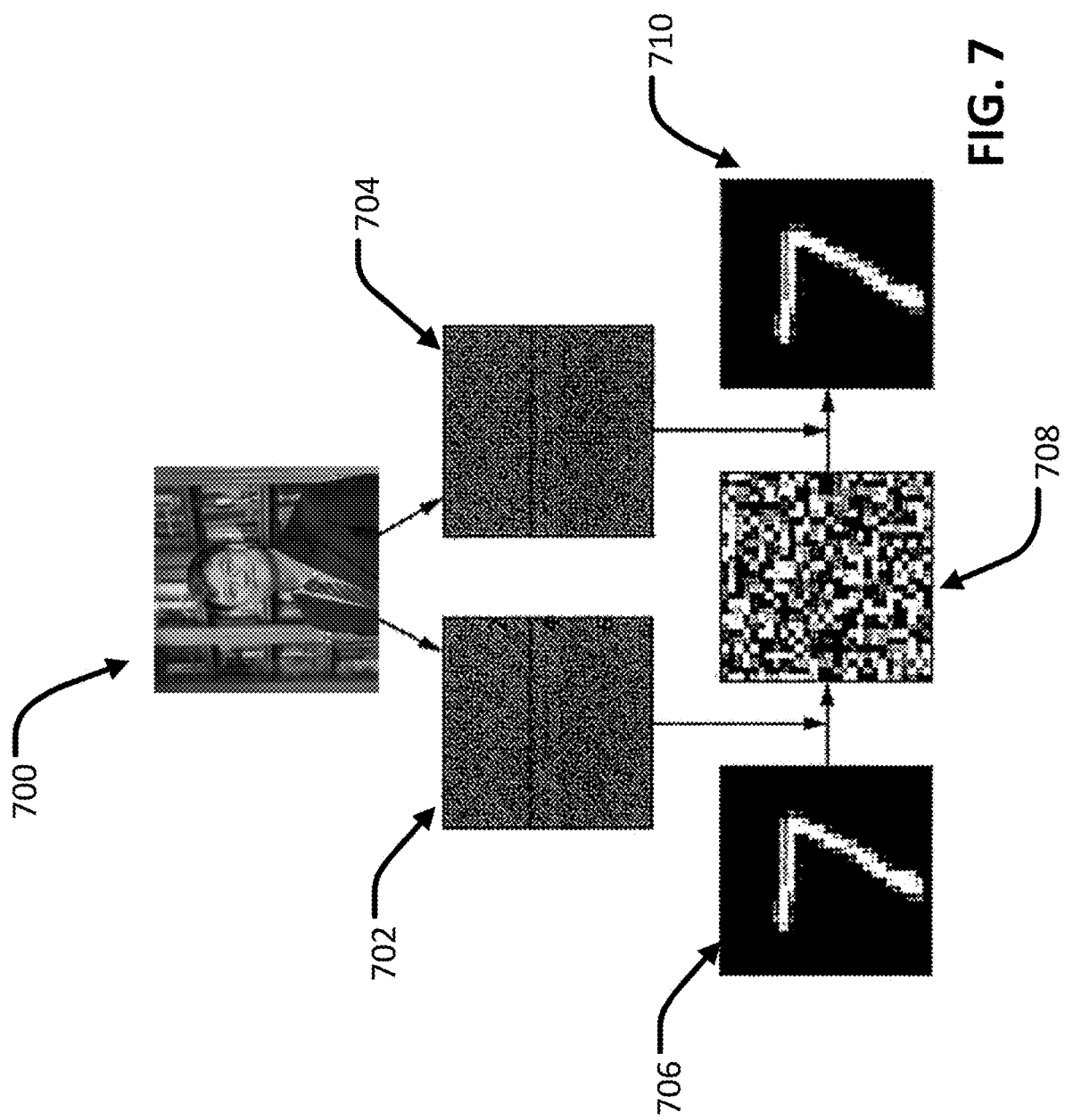
FIG. 7 illustrates an encryption and decryption process according to the disclosed embodiments.

FIG. 7 includes an image 700 (e.g., a digital image of size 784×784) to be used as the passkey. In operations according to the present embodiments, QR decomposition produces an encryption matrix 702 and a decryption matrix 704. The test image 706 may be, for example, an image from the MNSIT database. As shown, the encrypted image 708 is the product of unencrypted image 706 and encryption matrix 702. Similarly, the image 710, which has been decrypted, is the product encrypted image 708 and the decryption matrix 704.

Figure 8:
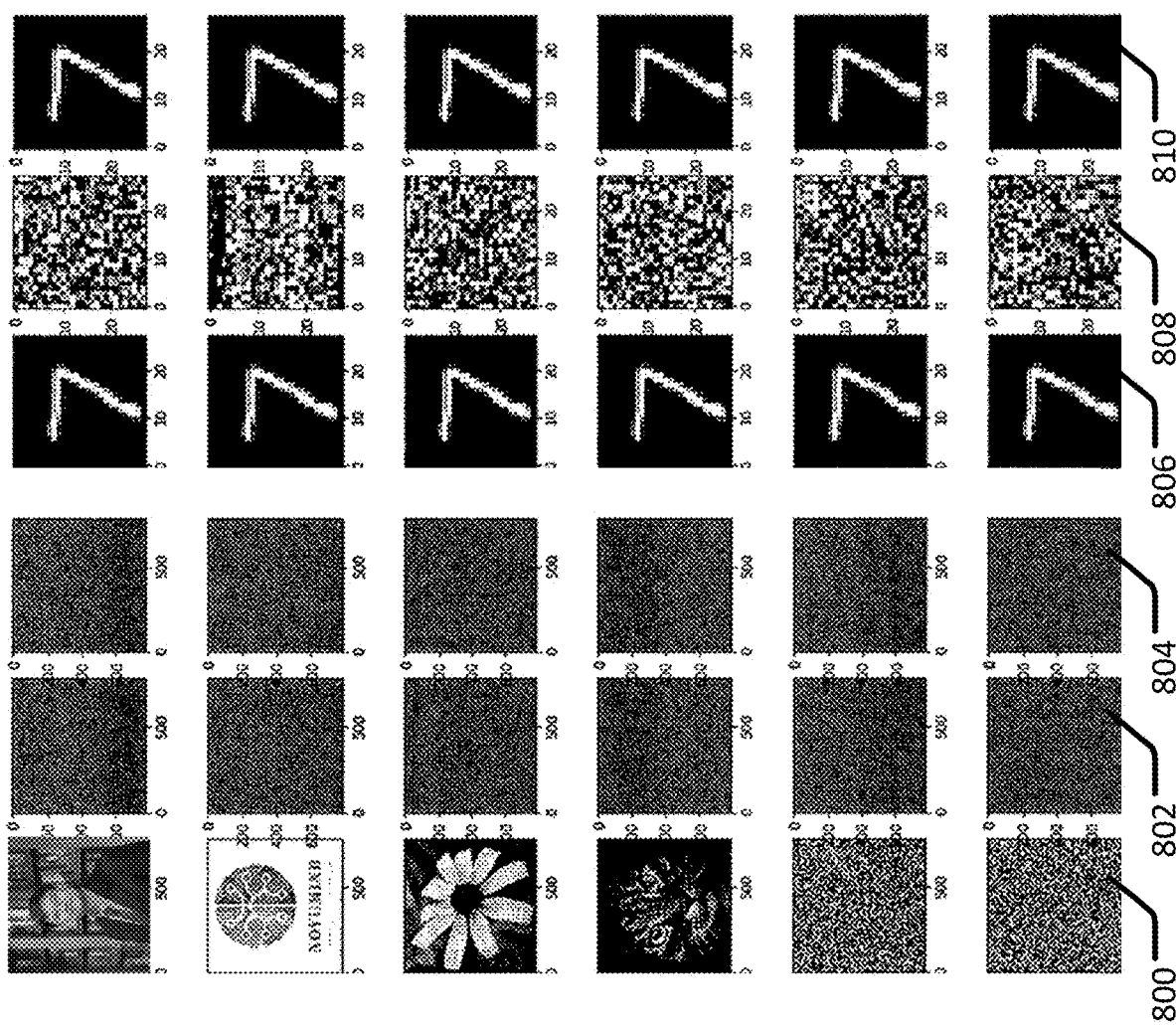
FIG. 8 illustrates multiple encryption and decryption utilizing different passkeys according to the disclosed embodiments.

FIG. 8 shows six different passkeys 800 used to generate six different encryption and decryption matrices 802, 804, respectively. FIG. 8 further shows six different images 806 representing the same alphanumeric digit "7". As shown, the images 806 are encrypted based on the six different passkeys 800 to generate encrypted images 808. The encrypted image 808 can, in turn, be decrypted based on the six passkeys 800. Without knowing the passkey used to encrypt, the EDLS provider or another $3^{rd}$ party could not associate any of the six encrypted images 808 with either of the images 806 and 810. While the EDLS provider and any other $3^{rd}$ party could not access information contained within image 806, the EDLS provider could utilize the encrypted images 808 to train and inference the data.

FIG. 9 is a chart 900 representing a performance benchmark comparison between the CryptoNets product and the disclosed embodiments. As illustrated in the charted results, the CryptoNets product utilizes 15 times more memory than the disclosed embodiments while operating at a significantly slower prediction speed. In particular, the charted results show that utilizing a less capable processor (e.g., the processor 114 or the processor 104 shown in FIG. 1), the disclosed embodiments exhibit an execution speed 280 times faster relative to the CryptoNets product. The execution speed advantage was realized while the disclosed embodiments utilized seven percent of the memory allocated to the CryptoNets product.

Figure 10:
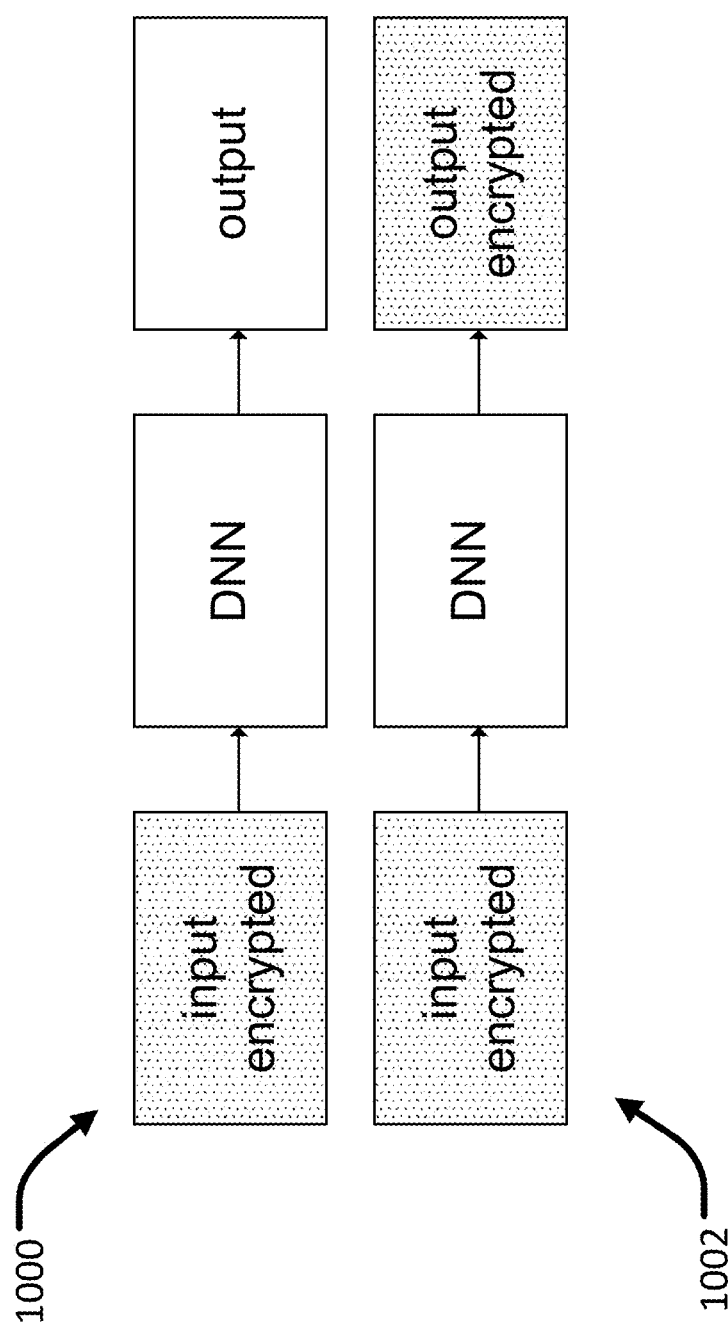
FIG. 10 illustrates EDLS processes having an encrypted output and an unencrypted output according to the present embodiments.

FIG. 10 illustrates a simple process 1000 by which an exemplary secure MNIST database, as describes above, receives encrypted data and outputs unencrypted labels. The process 1000 represents a special case process (e.g., one that would require 10 or fewer labels as shown in FIG. 6) that makes the output of unencrypted labels a trivial matter. For example, the data owner could also achieve additional security simply by randomizing the order in which the ten labels are provided to prevent the EDLS providers from understanding the output labels. FIG. 10 further illustrates a full encrypted deep learning process 1002 in which a deep neural network (DNN) is configured to receive an encrypted input and provide an encrypted output. The general encrypted deep learning process 1002 disclosed herein is discussed with reference to the simple process 1000 and the embodiments discussed above.

Figure 11:
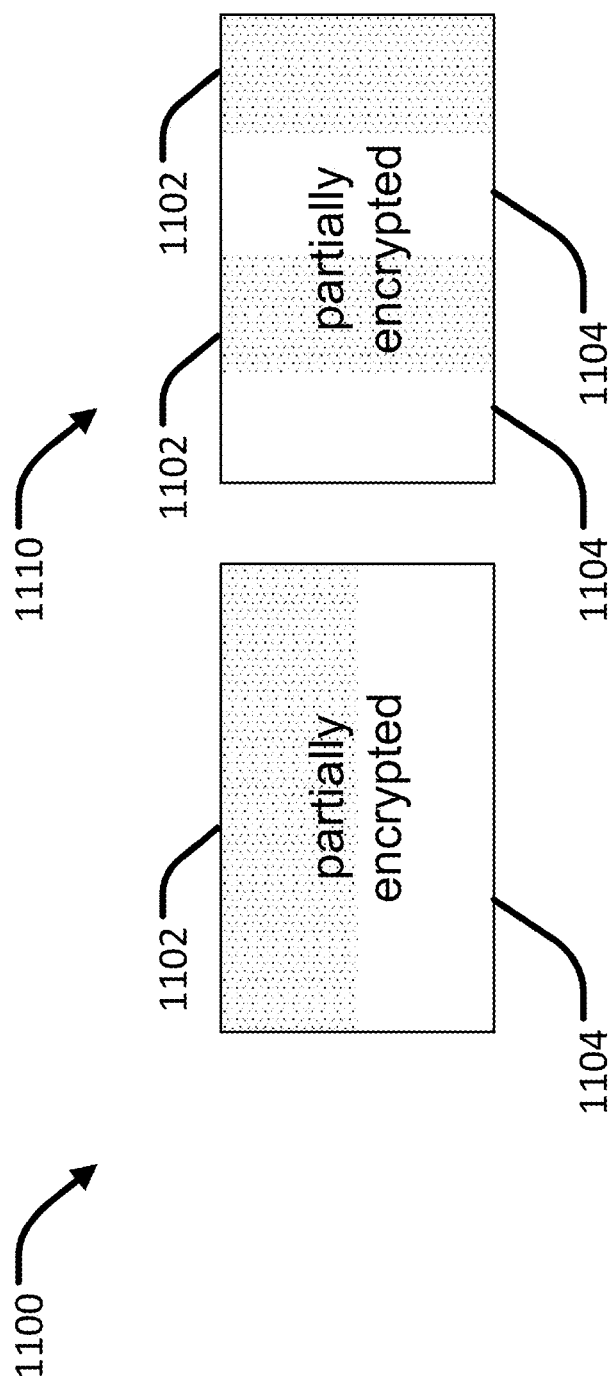
FIG. 11 illustrates two alternatives for partially encrypting input data according to the present embodiments.

FIG. 11 illustrates exemplary processes by which encrypted data and unencrypted data may be combined into input data for batch processing during training and inferencing. For example, a hospital may want to encrypt gender information and leave x-ray-scan information unencrypted (or vice versa). In another example, a financial institution may not care about revealing historical data during the training stage, but may desire to encrypt the individual stocks traded during the inference stage. Process 1100 represents encrypted data 1102 and unencrypted data 1104 combined into the same batches. Process 1110 represents encrypted data 1102 and unencrypted data 1104 combined into different batches. In operation, a DNN (e.g., the DNN shown in FIG. 10) is trained to identify mappings or patterns between inputs and outputs. The DNN itself does not know or care whether the inputs and outputs are encrypted data, unencrypted data or a combination of the two. A data owner or other client of an EDLS provider can choose to partially encrypt some or all of the data/labels for various reasons (e.g. efficiency).

FIG. 12 depicts various combinations of encrypted data and unencrypted data that may be provided to an EDLS. In particular, the illustrated combinations represent inputs and output to and from a DNN. The input to the DNN may be mixed encrypted data (cipher data) and unencrypted data (clear data) within a single batch and/or between different batches. Similarly, the output generated by the DNN may be unencrypted data, partially encrypted, or fully encrypted data.

Figure 13:
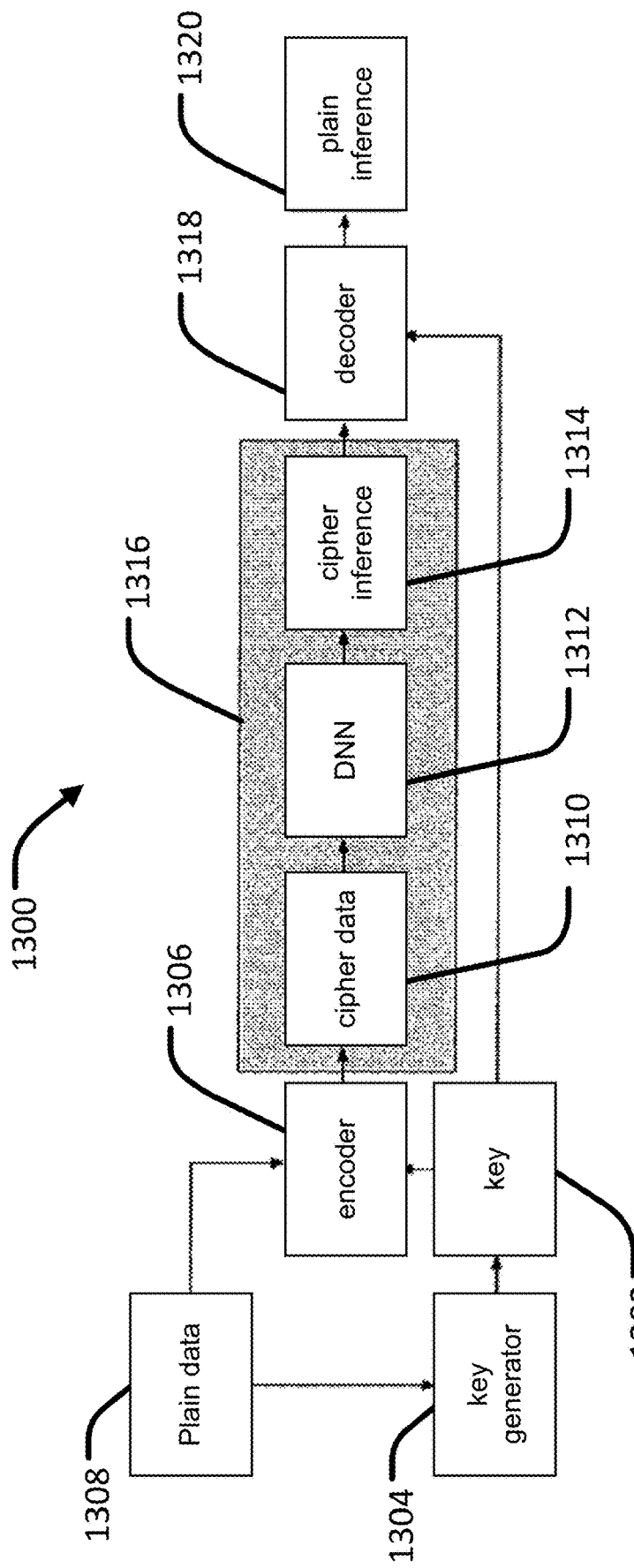
FIG. 13 illustrates an example of a secure MNIST process.

FIG. 13 depicts a secure MNIST process 1300. For example, a passkey 1302 provided by a key generator 1304 is used by the encoder 1306 to generate encrypted data 1310 based on the plain data 1308. The passkey 1302 may be selected and provided by the data owner. The encrypted data 1310 may be provided to the DNN 1312 which, in turn, generates an encrypted output 1314. The grey box 1316 represent encrypted processes and data accessible by the EDLS provider. In other words, 1316 may be referred as the EDLS provider. The decoder 1318 receives the encrypted output 1314 and generates an unencrypted output 1320. In this way, the EDLS provider may determine a mapping between encrypted input and output during training stage, and then provides encrypted inference during testing stage, without knowing either the plain data or the plain inference. The plain data or plain inference may include human readable images or human readable texts, etc.

Figure 14:
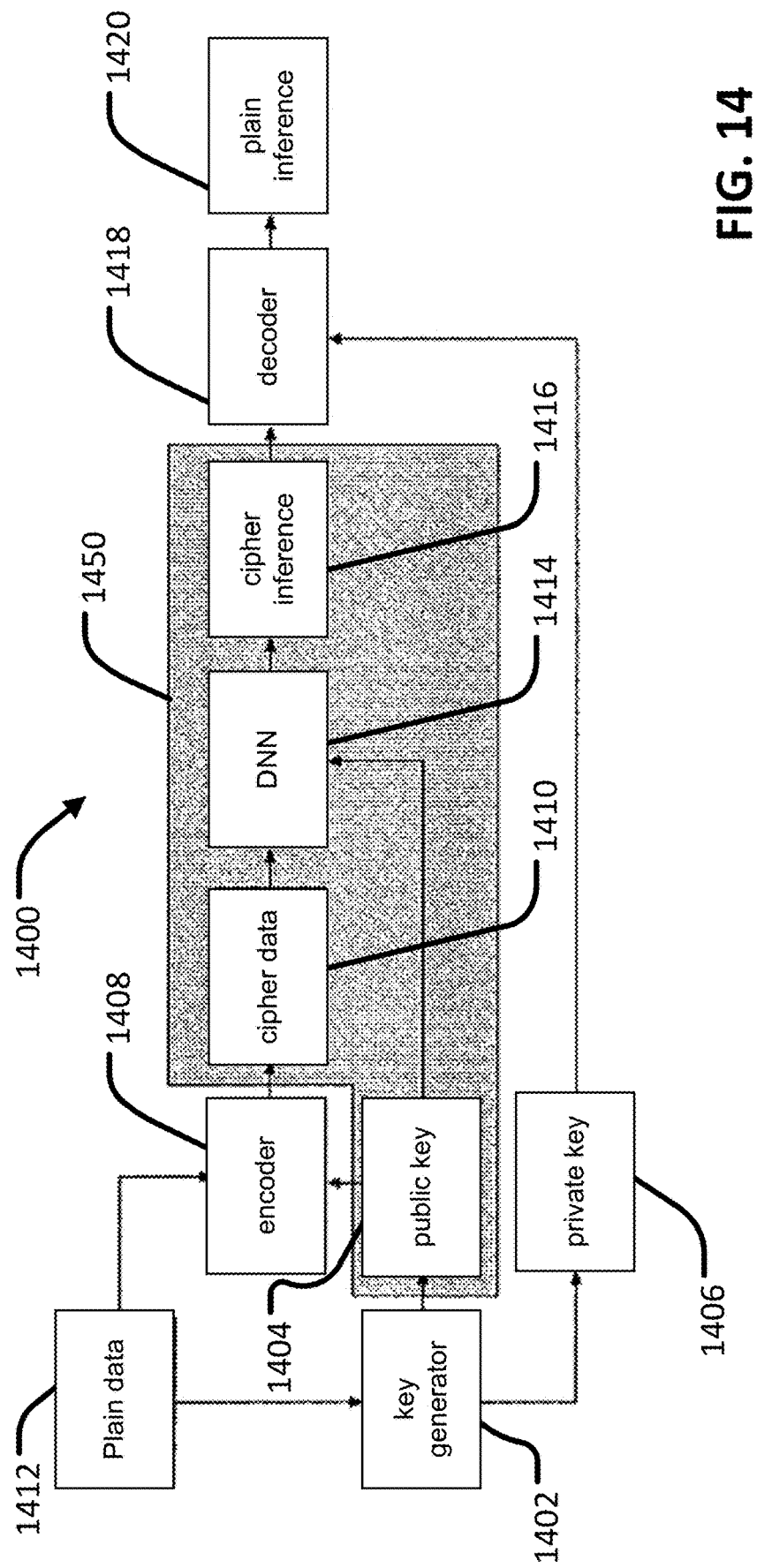
FIG. 14 illustrates an encrypted deep learning process utilizing public and private passkeys.

FIG. 14 depicts an encrypted deep learning process 1400 utilizing public and private passkeys. The processes in the box 1450 are implemented on the service provider side, which may be referred as the EDLS provider. For example, a key generator 1402 can generate a pubic passkey 1404 and a private passkey 1406. The public passkey 1404 may be provided to the encoder 1408 in order to generate the encrypted input 1410 based on the plain data 1412. The public passkey 1404 may further be provided to the DNN 1414 in order to generate an encrypted output 1416. The private passkey 1406 may be provided to the decoder 1418 in order to generate the unencrypted output 1420. Utilizing the process 1400, the EDLS provider can create its own training sets instead of relying solely on what the data owner provides. By creating a public-key/private-key pair, the EDLS provider can encrypt additional testing data to fine tune the process. The public key may additionally be used as an input to the DNN 1414.

Figure 15:
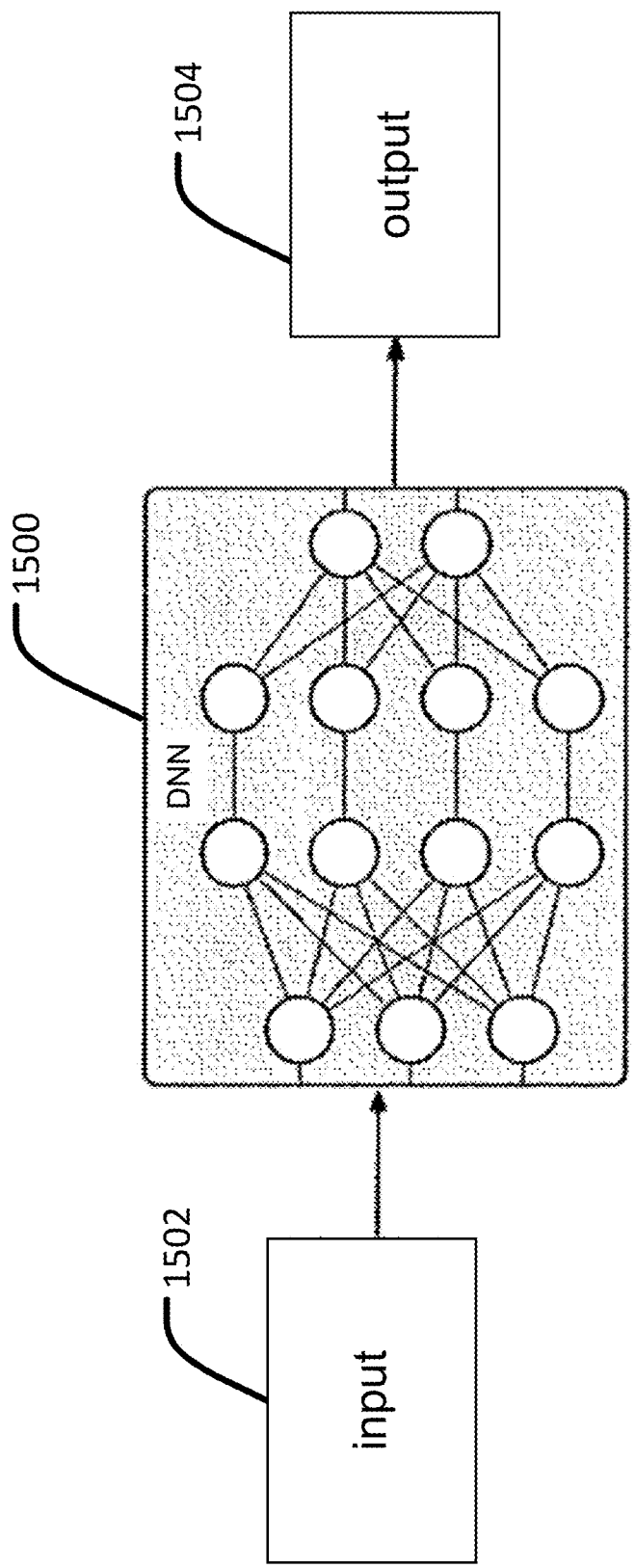
FIG. 15 illustrates a deep neural network (DNN) configured to operate without regard to the encryption status of the data.

FIG. 15 depicts a deep neural network (DNN) 1500 receiving inputs 1502 and generating outputs 1504 without regard to the encryption status of the data. In the illustrated example, the EDLS provider may maintain and control the whole system and perform all the processing locally. This typical process depicted in FIG. 15 may be implemented regardless the of the specific network configuration (i.e. network size, architecture, etc.) and the encryption status of the input put and output data.

Figure 16:
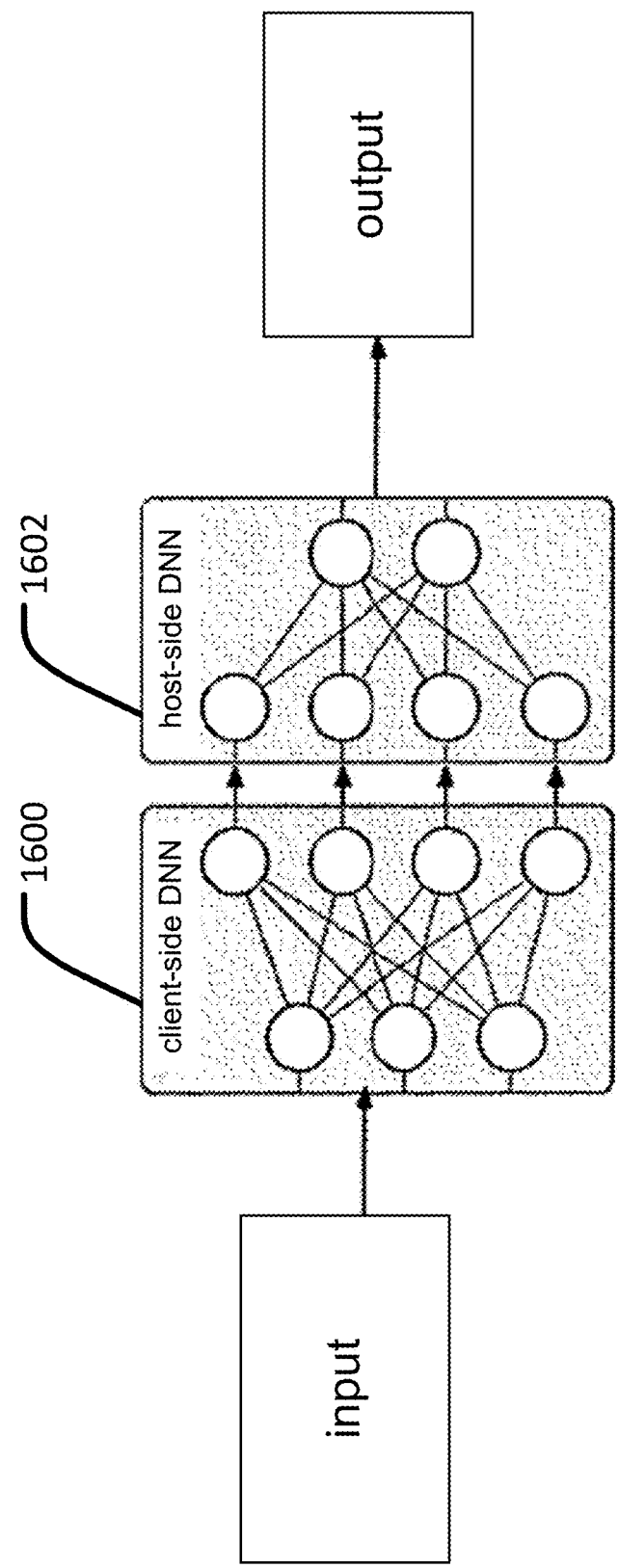
FIG. 16 illustrates the DNN partitioned into a client-side DNN and a host-side DNN.

FIG. 16 depicts the DNN 1500 partitioned into a client-side DNN 1600 and a host-side DNN 1602 while maintaining the functionality of the system depicted in FIG. 15. A portion of the computation can be moved to the client side DNN 1600, and another portion can be carried out locally (e.g., the host-side DNN 1602). In this configuration, the EDLS only sees the intermediate results without accessing the original data. Partition of the DNN 1500 into the client-side DNN 1600 and the host-side DNN 1602 is known and well-understood within the current technical field. Once the DNN 1500 is partitioned additional configuration options are available during training stage. For example, two half networks can be trained together. In another example, a pre-trained network can be used to act as the client side "half" network. When a pre-trained network is provided on the client side, it may not be that secure. If the service provider provide the pre-trained model, the service provider could theoretically keep a corresponding decoded model at the same time. The most secure way should be both the client and the service provider are training (and later inferencing) together, and each of parties is responsible of half the computations. In this way, it is very difficult for the service provider to decode the original message.

Figure 17:
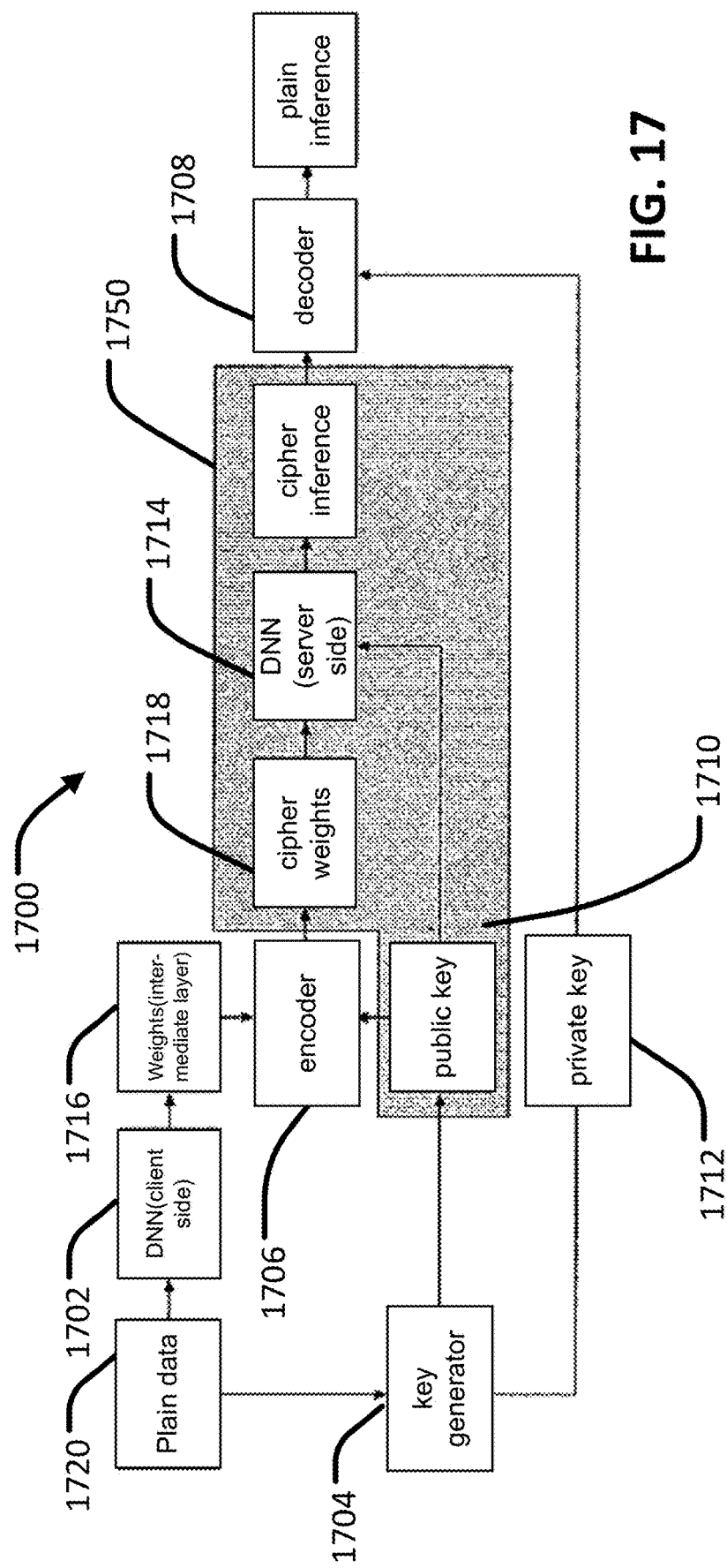
FIG. 17 illustrates a flow chart of a method according to one or more examples.

FIG. 17 depicts an encrypted deep learning process 1700 which configured as a split network utilizing public/private passkeys to work together. The processes in the box 1750 are implemented on the server-side, which may be referred as the server system at the EDLS provider. The encrypted deep learning process 1700 is an EDLS process in which plain data 1720 is input to a client-side DNN 1702. The client-side DNN 1702 is in communication with a key generator 1704 which, in turn, communicates with an encoder 1706 and a decoder 1708. The key generator 1704 creates public passkeys 1710 for the EDLS provider to encrypt additional training samples. The key generator 1704 further creates private passkeys 1712 to decode the encrypted data and inferences generated by the server-side DNN 1714. The weights 1716 (values from the intermediate layers) received from the client-side DNN 1702 can be further encrypted by the encoder 1706 to obtain the encrypted data 1718. The process 1700 provides additional flexibility for both data owners and the EDLS provider while maintaining the data security and encryption. Considering the three factors, mixed data, public/private key, and split network, there are endless configurations for conducting encrypted deep learning process.

Figure 18:
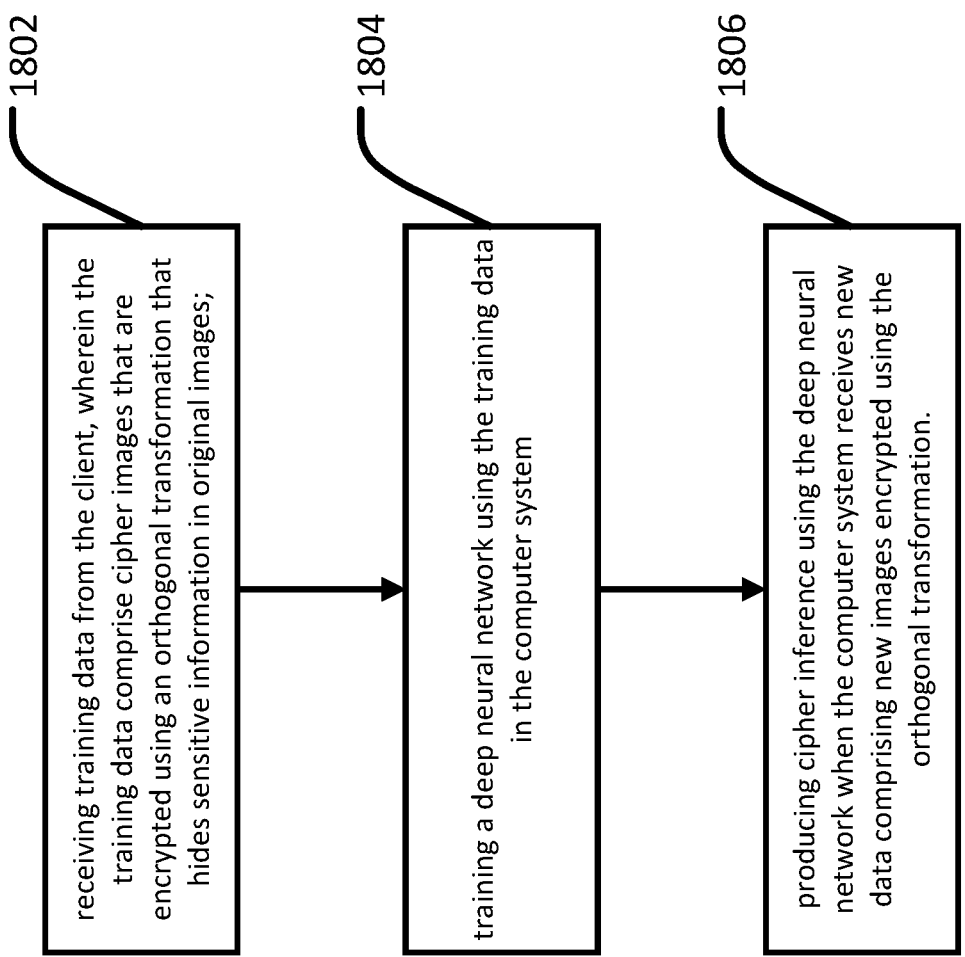
FIG. 18 is a hardware structure diagram of an apparatus according to one or more examples.

FIG. 18 is a flowchart of an exemplary encrypted deep learning process 1800. The process 1800 commences at step 1802 with receiving training data from the client, where the training data comprise cipher images that are encrypted using an orthogonal transformation that hides sensitive information in original images. At step 1804, training of a deep neural network using the training data in the computer system is commenced. At step 1806, the process 1800 completes with the producing of cipher inference using the deep neural network when the computer system receives new data comprising new images encrypted using the orthogonal transformation. The training data may be partially encrypted and a training data batch mixes cipher and clear data, where the clear data is not encrypted.

Figure 19:
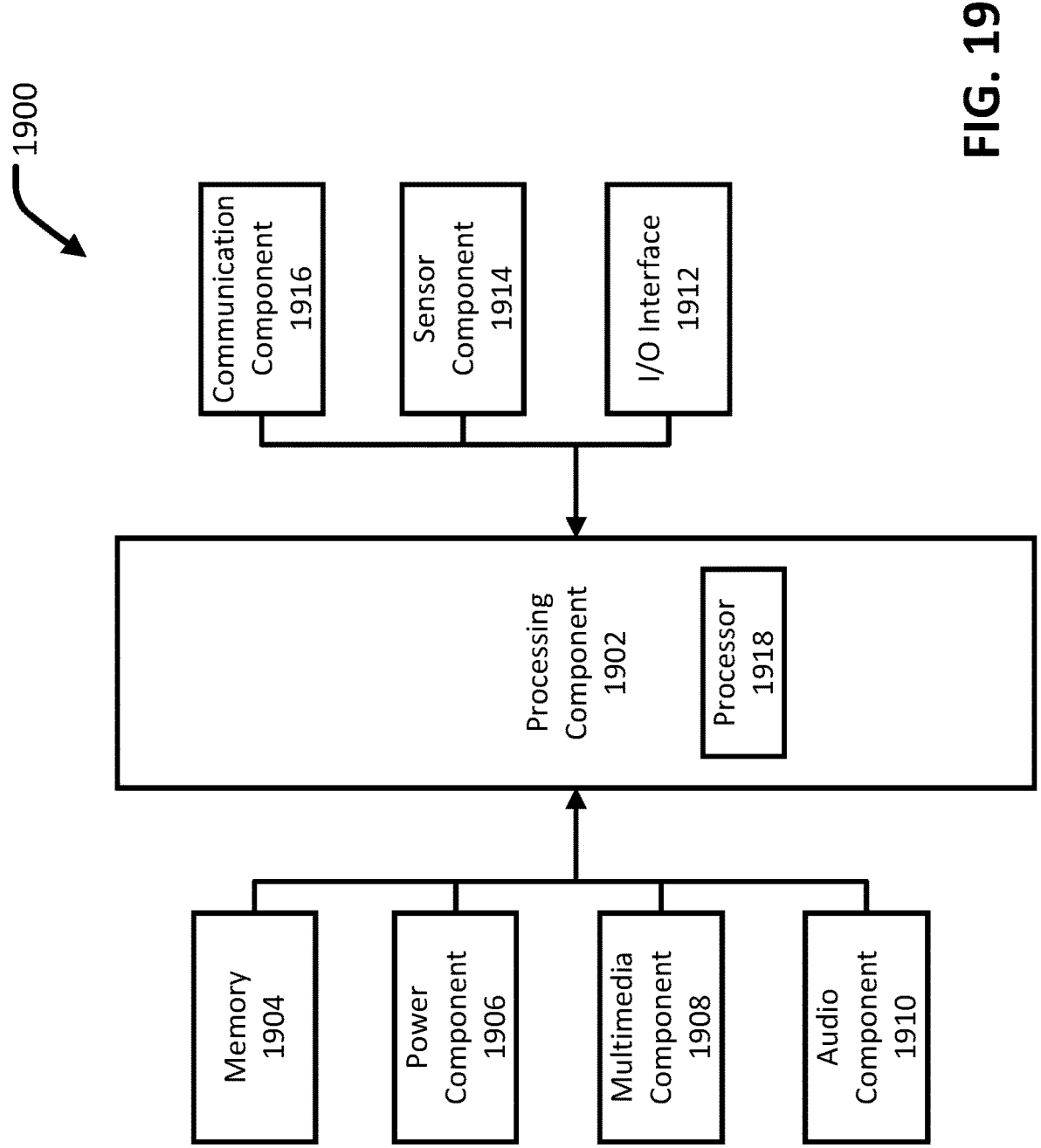
FIG. 19 illustrates a hardware structure diagram of an apparatus according to one or more embodiments.

FIG. 19 illustrates a hardware structure diagram of an apparatus according to one or more examples. The apparatus may be referred as a server device, an electronic device, a client device, a client side, a client end, or etc. For example, the apparatus 1900 may be computing device such as a server, a computer, a mobile phone, a digital broadcast terminal, a messaging device, a gaming console, a tablet, a medical device, an exercise equipment, a Personal Digital Assistant (PDA) and the like. The apparatus 1900 may include a pre-trained DNN so that the client may use the DNN with or without further training. The apparatus 1900 may receive partially encrypted data and produce partially encrypted inference as an output using a pre-trained DNN stored in the apparatus 1900.

Referring to FIG. 19, the apparatus 1900 may include one or more of the following components: a processing component 1902, a memory 1904, a power component 1906, a multimedia component 1908, an audio component 1910, an Input/Output (I/O) interface 1912, a sensor component 1914, and a communication component 1916.

The processing component 1902 typically controls overall operations of the apparatus 1900, such as the operations associated with display, telephone calls, data communications, camera operations, and recording operations. The processing component 1902 may include one or more processors 1918 to execute instructions to perform all or part of the steps in the abovementioned method. Moreover, the processing component 1902 may include one or more modules which facilitate interaction between the processing component 1902 and the other components. For instance, the processing component 1902 may include a multimedia module to facilitate interaction between the multimedia component 1908 and the processing component 1902.

The memory 1904 is configured to store various types of data to support the operation of the apparatus 1900. Examples of such data include instructions for any application programs or methods operated on the apparatus 1900, contact data, phonebook data, messages, pictures, video, etc. The memory 1904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1906 provides power for various components of the apparatus 1900. The power component 1906 may include a power management system, one or more power supplies, and other components associated with the generation, management and distribution of power for the apparatus 1900.

The multimedia component 1908 includes a screen providing an output interface between the apparatus 1900 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1908 includes a front camera and/or a rear camera. The front camera and/or the rear camera may receive external multimedia data when the apparatus 1900 is in an operation mode, such as a photographing mode or a video mode. Each of the front camera and the rear camera may be a fixed optical lens system or have focusing and optical zooming capabilities.

The audio component 1910 is configured to output and/or input an audio signal. For example, the audio component 1910 includes a Microphone (MIC), and the MIC is configured to receive an external audio signal when the apparatus 1900 is in the operation mode, such as a call mode, a recording mode and a voice recognition mode. The received audio signal may be further stored in the memory 1904 or sent through the communication component 1916. In some embodiments, the audio component 1910 further includes a speaker configured to output the audio signal.

The I/O interface 1912 provides an interface between the processing component 1902 and a peripheral interface module, and the peripheral interface module may be a keyboard, a click wheel, a button and the like. The button may include, but not limited to: a home button, a volume button, a starting button and a locking button.

The sensor component 1914 includes one or more sensors configured to provide status assessment in various aspects for the apparatus 1900. For instance, the sensor component 1914 may detect an on/off status of the apparatus 1900 and relative positioning of components, such as a display and small keyboard of the apparatus 1900, and the sensor component 1914 may further detect a change in a position of the apparatus 1900 or a component of the apparatus 1900, presence or absence of contact between the user and the apparatus 1900, orientation or acceleration/deceleration of the apparatus 1900 and a change in temperature of the apparatus 1900. The sensor component 1914 may include a proximity sensor configured to detect presence of an object nearby without any physical contact. The sensor component 1914 may also include a light sensor, such as a Complementary Metal Oxide Semiconductor (CMOS) or Charge Coupled Device (CCD) image sensor configured for use in an imaging application. In some embodiments, the sensor component 1914 may also include an acceleration sensor, a gyroscope sensor, a magnetic sensor, a pressure sensor or a temperature sensor.

The communication component 1916 is configured to facilitate wired or wireless communication between the apparatus 1900 and another device. The apparatus 1900 may access a communication-standard-based wireless network, such as a Wireless Fidelity (WiFi) network, a 2nd-Generation (2G) or 3rd-Generation (3G) network or a combination thereof. In an exemplary embodiment, the communication component 1916 receives a broadcast signal or broadcast associated information from an external broadcast management system through a broadcast channel. In an exemplary embodiment, the communication component 1916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the apparatus 1900 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The apparatus may use the circuitries in combination with the other hardware or software components for performing the above described methods. Each module, sub-module, unit, or sub-unit in the disclosure may be implemented at least partially using the one or more circuitries.

In an exemplary embodiment, there is also provided a non-transitory computer-readable storage medium including an instruction, such as the memory 1904 including an instruction, and the instruction may be executed by the processor 1918 of the apparatus 1900 to implement the abovementioned unlocking method. For example, the non-transitory computer-readable storage medium may be a ROM, a Random Access Memory (RAM), a Compact Disc Read-Only Memory (CD-ROM), a magnetic tape, a floppy disc, an optical data storage device and the like. Further, each module or sub-module may include non-transitory memory (shared, dedicated, or group) that stores code or instructions that can be executed by one or more processors. The module or sub-module may take the form of a packaged functional hardware unit designed for use with other components, a portion of a program code (e.g., software or firmware) executable by the processor 1918, one or more circuitries that usually perform a particular function of related functions, or a self-contained hardware or software component that interfaces with a larger system, for example.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

According to the technical solutions of the disclosure, when the touch key layer senses the touch operation performed on the input circuitry, the touch pressure is acquired through the pressure sensing layer, the response instruction is generated according to the touch pressure, and the terminal executes the response instruction. Since the response instruction is generated according to the touch pressure of the touch operation, the problem that user's false touch operations are responded by a terminal may be avoided, and it is possible to achieve the effects of effectively distinguishing intended operation and the false touch operation of the user and improving user experiences.

It will be appreciated that the present disclosure is not limited to the exact examples that has been described above and illustrated in the accompanying drawings, and that various modifications and changes may be made without departing from the scope thereof. It is intended that the scope of the present disclosure only be limited by the appended claims.

What is claimed is:

1. A computer system for providing Encrypted Deep Learning Service (EDLS) to a client, comprising:
   one or more processors; and
   memory storing instructions that, when executed by the one or more processors, cause the computer system to perform acts comprising:
   receiving training data from the client, wherein the training data comprise cipher images that are encrypted using an orthogonal transformation that hides sensitive information in original images;
   training a deep neural network using the training data in the computer system;
   producing cipher inference using the deep neural network when the computer system receives new data comprising new images encrypted using the orthogonal transformation; and
   receiving a passkey image selected by the client and producing an orthogonal matrix using QR decomposition to decompose the passkey image, wherein the orthogonal matrix is used to implement the orthogonal transformation.

2. The computer system of claim 1, wherein the acts further comprise:

outputting plain inference to the client based on the cipher inference using a decoder.

3. An apparatus for providing computation service, comprising:
one or more processors; and
memory storing instructions that, when executed by the one or more processors, cause the apparatus to perform acts comprising:
receiving training data from the client, wherein the training data are at least partially encrypted using an orthogonal transformation that hides sensitive information in the training data;
training a deep neural network using the training data;
producing inference using the trained deep neural network when receiving new data encrypted using the orthogonal transformation; and
receiving a passkey image selected by the client and producing an orthogonal matrix using QR decomposition to decompose the passkey image, wherein the orthogonal matrix is used to implement the orthogonal transformation at client side.

4. The apparatus of claim 3, wherein the sensitive information comprise human-readable information and the orthogonal transformation hides the human-readable information in the training data.

5. The apparatus of claim 3, wherein the training data comprise cipher images that are encrypted using the orthogonal transformation.

6. The apparatus of claim 3, wherein producing inference using the trained deep neural network system comprises:
producing cipher inference using the deep neural network, the cipher inference being configured to hide human-readable inference.

7. The apparatus of claim 6, wherein the acts further comprise:
outputting plain inference to the client based on the cipher inference using a decoder at the client side.

8. The apparatus of claim 3, wherein the acts further comprise:
obtaining, by a third-party system, the cipher data along with a public key to train a second neural network to be a decoder at the third-party system.

9. The apparatus of claim 3, wherein the training data are partially encrypted and a training data batch mixes cipher and clear data.

10. The apparatus of claim 3, wherein when the training data comprise time-based data, the time based-data mixes cipher and clear data in different batches.

11. A method for providing Encrypted Deep Learning Service (EDLS) to a client, comprising:
receiving training data from the client, wherein the training data are at least partially encrypted using an orthogonal transformation that hides sensitive information in the training data;
training a deep neural network using the training data;
producing inference using the trained deep neural network when receiving new data encrypted using the orthogonal transformation; and
receiving a passkey image selected by the client and producing an orthogonal matrix using QR decomposition to decompose the passkey image, wherein the orthogonal matrix is used to implement the orthogonal transformation at client side.

12. The method of claim 11, wherein the sensitive information comprise human-readable information and the orthogonal transformation hides the human-readable information in the training data.

13. The method of claim 11, wherein the training data comprise cipher images that are encrypted using the orthogonal transformation.

14. The method of claim 11, wherein producing inference using the trained deep neural network system comprises:
producing cipher inference using the deep neural network, the cipher inference being configured to hide human-readable inference.

15. The method of claim 14, further comprising:
outputting plain inference to the client based on the cipher inference using a decoder; and
obtaining the cipher data along with a public key to train a second neural network to be the decoder.

16. The method of claim 11, wherein the training data are partially encrypted and a training data batch mixes cipher and clear data.

17. The method of claim 11, wherein when training data comprise time-based data, the time based-data mixes cipher and clear data in different batches.

* * * * *